(12) United States Patent
Sheard

(10) Patent No.: US 9,234,620 B2
(45) Date of Patent: Jan. 12, 2016

(54) PIPE ATTACHMENT

(71) Applicant: Julian Sheard, Dover (GB)

(72) Inventor: Julian Sheard, Dover (GB)

( * ) Notice: Subject to any disclaimer, the term of this patent is extended or adjusted under 35 U.S.C. 154(b) by 123 days.

(21) Appl. No.: 13/851,299

(22) Filed: Mar. 27, 2013

(65) Prior Publication Data
US 2014/0290780 A1  Oct. 2, 2014

(51) Int. Cl.
*F16L 55/16* (2006.01)
*F16L 55/168* (2006.01)
*F16L 55/17* (2006.01)

(52) U.S. Cl.
CPC ............... *F16L 55/168* (2013.01); *F16L 55/17* (2013.01)

(58) Field of Classification Search
CPC ....... F16L 55/17; F16L 55/171; F16L 55/178; F16L 55/1715; F16L 55/1705
USPC ....................................................... 138/99, 97
See application file for complete search history.

(56) References Cited

U.S. PATENT DOCUMENTS

| | | | | |
|---|---|---|---|---|
| 294,937 | A * | 3/1884 | Towle, Jr. ........................ | 138/99 |
| 1,343,463 | A * | 6/1920 | Meredith ........................ | 138/99 |
| 3,502,112 | A * | 3/1970 | Hankila ........................ | 138/99 |
| 5,577,535 | A * | 11/1996 | Motta et al. .................... | 138/99 |
| 6,971,413 | B2 * | 12/2005 | Taylor et al. .................... | 138/99 |

FOREIGN PATENT DOCUMENTS

| | | |
|---|---|---|
| CN | 201787268 | 4/2011 |
| DE | 571345 | 2/1933 |
| GB | 210647 | 2/1927 |
| GB | 2416013 | 1/2006 |
| GB | 2464489 | 4/2010 |
| WO | 2011045608 | 4/2011 |

OTHER PUBLICATIONS

Search Report issued in GB1016123.0.

* cited by examiner

*Primary Examiner* — Patrick F Brinson
(74) *Attorney, Agent, or Firm* — Haugen Law Firm

(57) ABSTRACT

A pipe attachment for sealing a leak, the attachment comprising a frame formed by a pair of opposed jaws which when closed define a substantially cylindrical cavity, and a stretchable waterproof membrane secured to the frame; wherein each jaw has a distal end and the frame comprises an intermediate portion located between said opposed distal ends, said jaws having a closed configuration in which said distal ends of the jaws are adjacent to each other, and an open configuration in which said distal ends of the jaws are spaced apart from each other; the frame including a securing means for resisting the opening of the jaws in said closed configuration; and wherein the stretchable waterproof membrane includes opposed end portions, each of said membrane end portions being secured to the distal end portion of a respective jaw and said stretchable waterproof membrane being secured to the frame only via said end portions; the stretchable waterproof membrane having an unstretched configuration when the cavity is empty and the jaws are closed in which it is spaced from said intermediate portion of the frame and a stretched configuration when a pipe is located within the cavity in which it is urged towards the intermediate portion by said pipe and is stretched around said pipe.

15 Claims, 3 Drawing Sheets

PIPE ATTACHMENT

FIELD OF THE INVENTION

The present invention relates to pipe attachments and in particular to pipe attachments adapted to seal a leak in a pipe. The pipe attachment may provide a temporary fix to the leak or it may provide a permanent fix.

BACKGROUND OF THE INVENTION

Pipe attachments to provide a temporary fix to a leak in a pipe are well known. However, the known pipe attachments are typically based upon a frame which is sized to fit around a specific diameter pipe, where the frame carries a sealing element on its inwardly facing surface. In use the sealing element is pressed against the outer surface of the pipe by the frame and the frame is then locked in position.

Examples of such known pipe attachments are disclosed in the following documents:
GB2464489
GB2416013
GB210647
WO2011/045608
CN201787268
DE571345

However, this type of pipe attachment tends to suffer from two problems. Firstly, the attachment is designed to work on pipes which have a pristine outer surface, with no imperfections to interfere with the seal provided by the sealing element. However, in practice, pipes often have drips of solder or paint on their outer surface or otherwise have a less than perfect outer surface. As a result of this, the sealing element is often unable to provide a good seal and the pipe attachment does not completely stop the leak.

Secondly, the known attachments tend to be specific to pipes have a certain diameter, e.g. half inch pipes, and they cannot be used with pipes of different diameters.

SUMMARY OF THE INVENTION

The present invention seeks to provide a pipe attachment which can be used with pipes having a less than perfect outer surface and which can be used with pipes having different diameters.

In order to achieve these goals, the present invention utilises a stretchable, flexible, waterproof membrane which can be stretched around a pipe which is leaking, rather than providing a sealing element which has to be pressed into contact with the pipe.

A stretched membrane is more easily able to accommodate imperfections on the outer surface of the pipe. It is also possible to stretch it around pipes having different diameters.

According to a first aspect of the present invention, there is provided a pipe attachment for sealing a leak, the attachment comprising a frame formed by a pair of opposed jaws which when closed define a substantially cylindrical cavity, and a stretchable waterproof membrane secured to the frame; wherein each jaw has a distal end and the frame comprises an intermediate portion located between said opposed distal ends, said jaws having a closed configuration in which said distal ends of the jaws are adjacent to each other, and an open configuration in which said distal ends of the jaws are spaced apart from each other; the frame including a securing means for resisting the opening of the jaws in said closed configuration; and wherein the stretchable waterproof membrane includes opposed end portions, each of said membrane end portions being secured to the distal end portion of a respective jaw and said stretchable waterproof membrane being secured to the frame only via said end portions; the stretchable waterproof membrane having an unstretched configuration when the cavity is empty and the jaws are closed in which it is spaced from said intermediate portion of the frame and a stretched configuration when a pipe is located within the cavity in which it is urged towards the intermediate portion by said pipe and is stretched around said pipe.

By securing the stretchable, flexible waterproof membrane only at its end portions to the distal ends of the jaws, it is free to stretch around pipes having different diameters, provided that the frame can accommodate the pipe. Thus, the attachment of the present invention can be used with pipes having a diameter which is smaller than the diameter of the substantially cylindrical cavity defined by the jaws of the frame.

Additionally, by providing a seal via a stretched waterproof membrane, the membrane is able to accommodate imperfections in the outer surface of the pipe, for example as caused by drips of solder or paint.

The frame may be formed from two separate jaw members which are hingedly coupled to each other or it may be formed from a unitary frame element which defines the two opposed jaws. In embodiments where the frame is formed from two separate jaw members, each jaw member typically includes a proximal end opposite to the distal end and the jaw members are suitably hinged at their proximal ends. In such embodiments, each jaw includes an intermediate portion disposed between the distal and proximal ends.

The skilled person will appreciate that the opposed distal ends of the jaws are formed from distal frame portions which are elongate and extend parallel to the central axis of the substantially cylindrical cavity. Where the frame comprises a pair of opposed jaw members which include proximal ends, the proximal ends of the jaw members correspond to the distal ends in the sense that they are parallel to the distal frame portions and substantially co-terminus therewith.

In embodiments of the invention where the frame is formed from a single frame element, this is shaped to define the two opposed jaws. In this embodiment, the frame includes a single intermediate portion located between the two opposed distal ends of the jaws.

The jaws may be biased towards each other. The securing means may include a biasing element, which may in turn be a spring. Thus, the frame may include a separate spring element. Additionally or alternatively, the frame may be formed from a sprung metal such that the jaws are inherently biased towards each other. By biasing the jaws towards each other, the pipe attachment can be attached to pipes where access is restricted. This is because the simple act of releasing the opening force which urges open the jaws against the biasing force causes the attachment to be secured around the pipe in question and to seal a leak therein by stretching the membrane around the pipe in a sealing manner.

In embodiments in which the opposed jaws are biased towards each other (in other words, where the securing means includes a biasing element), the frame may further include a latching means to latch the jaws in the closed configuration. In certain situations, the pressure of fluid within the pipe may be relatively high and the biasing force exerted by the biasing means may not be sufficient to form a seal. In such embodiments, the latching means provides an additional means for maintaining the jaws in a closed configuration and sealing the leak in the pipe.

In an embodiment of the invention, the frame includes one or more voids or apertures defined within the intermediate portion(s) of the frame. Such voids allow the pipe attachment of the invention to accommodate more easily imperfections in the outer surface of the pipe. They also allow the pressure of the fluid within the pipe to act on the membrane without impairing the seal. For example, the pressure of the fluid within the pipe may cause the membrane to be deflected such that it projects beyond the outer circumference of the frame without causing the seal to fail. Such flexibility is considered useful in providing a fluid-tight seal.

The voids may be formed by removing material from areas of the intermediate portion(s). Alternatively, each intermediate portion may comprise two or more curved transverse supports located between said opposed distal ends of the jaws, or between a distal end and a proximal end of each jaw member, and the void is defined between the transverse supports.

In order to assist with moving the jaws from a closed configuration to an open configuration, the attachment may include one or more levers projecting from the jaws. This is useful where the pipe attachment includes a biasing means adapted to bias the jaws together in the closed configuration. Suitably, a pair of levers is provided. In an embodiment of the invention, the levers are arranged to open the jaws when they are urged towards each other. Such an arrangement permits a one-handed operation of the attachment, as the jaws can be opened with one hand, the attachment can be urged over the leaking pipe and the jaws closed by releasing the levers and optionally manually latching closed the jaws.

In embodiments where the jaws are defined by two separate jaw components which are hinged together at their proximal ends, a lever may extend rearwardly (i.e. away from the jaws) from each jaw component. Each lever is suitably secured to or extends from the proximal end of the respective jaw component in a manner similar to a pair of scissors or a pair of pliers.

In alternative embodiments, a lever may be coupled to the distal end of a respective jaw. The levers in this embodiment may be fixed to the distal ends of the jaws (i.e. they are not able to be removed or detached from the jaws) or they may be releasably coupled or detachable from the jaws. By having the levers detachable from the attachment, the attachment can more easily be used as a permanent fix for the leak, without the levers interfering with items surrounding the pipe and/or without the risk that the levers might unintentionally be contacted whereby the seal may be broken.

In an embodiment of the invention, the levers may be extendable. Such an arrangement makes it easier to access pipes with very restricted accessibility, such as pipes located beneath floorboards or pipes running behind objects which are difficult to move. The extendable levers may include a telescopic portion. Alternatively, the levers may be configured such that secondary, tertiary, etc. levers may be engaged with the primary lever to thereby double, triple, etc. the effective length of the lever. In a further alternative embodiment, a standard length lever may be detached and replaced with an elongate replacement lever which is longer than said standard length lever.

In embodiments where additional lever portions may be added to a primary lever, each lever may include a portion which is adapted to receive a portion of a further lever. Thus, each lever may include an extension means adapted or configured to engage with a second extension means provided on a lever extension component.

In an embodiment of the invention, the stretchable, flexible waterproof membrane is formed from an elastomer. Suitable elastomers include rubber materials such as unsaturated rubbers (i.e. rubbers that can be cured by a vulcanisation process) or saturated rubbers that are not able to undergo vulcanisation. In an embodiment, the elastomer is selected from polyisoprene, polybutadiene, chloroprene, isobutylene/isoprene copolymer (butyl rubber), halogenated butyl rubber, styrene/butadiene copolymer, nitrile rubber (including halogenated nitrile rubbers), ethylene/propylene copolymer (EPM rubber), ethylene/propylene/diene copolymer (EPDM rubber), epichlorohydrin rubber, silicone rubber (including halogenated silicone rubber), fluoroelastomers, perfluoroelastomers, ethylene vinyl acetate, elastomeric polyurethane and combinations thereof. However, other known rubbers that are able to be stretched and which are able to form a waterproof seal are considered to be within the scope of the present invention.

The elastomer is secured only to the distal ends of the jaws of the attachment. This may be achieved by adhering the elastomeric membrane to the distal ends of the jaws. Alternatively, the elastomeric membrane may be welded to the jaws of the attachment. This may the case where the jaws of the attachment are formed from a polymeric material.

The membrane may extend beyond one or both sides of the frame. This permits a secondary use of the attachment. Leaks in pipes may occur where a joint of fixing engages the pipe. By having the membrane extend beyond one or both sides of the frame, it is possible to abut the attachment against a joint or fixing that is leaking to seal the leak. In this way, the portion of the membrane which extends beyond the side of the frame can be urged sideways against the side of the joint or fixing in such a way that a seal is formed. The frame can be secured against the pipe in this configuration to maintain the seal between attachment and the joint or fixing via the membrane extending from one side of the frame.

According to a second aspect of the invention, there is provided a method of stopping a leak in a pipe, said method comprising:
  (i) providing a pipe attachment comprising a frame formed by a pair of opposed jaws which when closed define a substantially cylindrical cavity, and a stretchable waterproof membrane secured to the frame; wherein each jaw has a distal end and the frame comprises an intermediate portion located between said opposed distal ends, said jaws having a closed configuration in which said distal ends of the jaws are adjacent to each other, and an open configuration in which said distal ends of the jaws are spaced apart from each other; the frame including a securing means for resisting the opening of the jaws in said closed configuration; and wherein the stretchable waterproof membrane includes opposed end portions, each of said membrane end portions being secured to the distal end portion of a respective jaw and said stretchable waterproof membrane being secured to the frame only via said end portions; the stretchable waterproof membrane having an unstretched configuration when the cavity is empty and the jaws are closed in which it is spaced from said intermediate portion of the frame and a stretched configuration when a pipe is located within the cavity in which it is urged towards the intermediate portion by said pipe and is stretched around said pipe;
  (ii) configuring the jaws into an open configuration;
  (iii) urging the attachment over a portion of the pipe that contains the leak such that the pipe is located within the cavity defined by the jaws and the stretchable waterproof membrane is urged into a stretched configuration; and
  (iv) securing the jaws in the closed configuration whereby the stretchable waterproof membrane is stretched around the pipe to form a substantially watertight seal around the leak.

The attachment may be as defined or described anywhere hereinabove.

Thus, in an embodiment of the second aspect of the invention, the frame includes one or more voids defined within said intermediate portion and a portion of said stretchable waterproof membrane surrounding the leak extends beyond the frame through a void. The flexibility of the membrane and its ability to be deflected by the fluid provides a better seal with the pipe.

Additionally, the securing element may be a biasing element arranged to bias said jaws to the closed position and each jaw may include a lever projecting away from its distal end; and the step of urging the jaws into their open configuration may include urging said levers towards each other.

In a further embodiment, the step of securing the jaws in the closed configuration includes permitting the jaws to be biased back to their closed configuration by releasing the levers.

According to a third aspect of the invention, there is provided a pipe attachment for sealing a leak, the attachment comprising a frame formed by a pair of opposed jaws which when closed define a substantially cylindrical cavity, and a sealing element secured to the frame; wherein each jaw has a distal end, said jaws having a closed configuration in which said distal ends of the jaws are adjacent to each other, and an open configuration in which said distal ends of the jaws are spaced apart from each other; the frame including a securing means for resisting the opening of the jaws in said closed configuration; and wherein the attachment further includes a pair of detachable levers for opening the jaws.

By having the levers detachable from the attachment, the attachment can more easily be used as a permanent fix for the leak, without the levers interfering with items surrounding the pipe and/or without the risk that the levers might unintentionally be contacted whereby the seal may be broken.

The detachable levers are suitably coupled to the distal ends of the jaws.

The jaws are suitably biased to the closed configuration. In this embodiment, the levers are arranged for a user to counteract the biasing force and to urge the jaws into the open configuration. In this embodiment, the securing means may include a biasing element, which may in turn be a spring. Thus, the frame may include a separate spring element. Additionally or alternatively, the frame may be formed from a sprung metal such that the jaws are inherently biased towards each other. By biasing the jaws towards each other, the pipe attachment can be attached to pipes where access is restricted. This is because the simple act of releasing the opening force applied to the levers which maintains the jaws in the open configuration against the biasing force causes the attachment to be secured around the pipe in question and to seal a leak therein via the sealing element.

In embodiments in which the opposed jaws are biased towards each other (in other words, where the securing means includes a biasing element), the frame may further include a latching means to latch the jaws in the closed configuration. In certain situations, the pressure of fluid within the pipe may be relatively high and the biasing force exerted by the biasing means may not be sufficient to form a seal. In such embodiments, the latching means provides an additional means for maintaining the jaws in a closed configuration and sealing the leak in the pipe.

In an embodiment of the invention, the frame includes one or more voids or apertures defined within the intermediate portion(s) of the frame. Such voids allow the pipe attachment of the invention to accommodate more easily imperfections in the outer surface of the pipe. They also allow the pressure of the fluid within the pipe to act on the sealing element without impairing the seal. For example, the pressure of the fluid within the pipe may cause the sealing element to be deflected such that it projects beyond the outer circumference of the frame without causing the seal to fail. Such flexibility is considered useful in providing a fluid-tight seal.

The voids may be formed by removing material from areas of the intermediate portion(s). Alternatively, each intermediate portion may comprise two or more curved transverse supports located between said opposed distal ends of the jaws, or between a distal end and a proximal end of each jaw member, and the void is defined between the transverse supports.

In an embodiment of the invention, the levers are arranged to open the jaws when they are urged towards each other. Such an arrangement permits a one-handed operation of the attachment, as the jaws can be opened with one hand, the attachment can be urged over the leaking pipe and the jaws closed by releasing the levers and optionally manually latching closed the jaws.

In an embodiment of the invention, the levers may be extendable. Such an arrangement makes it easier to access pipes with very restricted accessibility, such as pipes located beneath floorboards or pipes running behind objects which are difficult to move. The extendable levers may include a telescopic portion. Alternatively, the levers may be configured such that secondary, tertiary, etc. levers may be engaged with the primary lever to thereby double, triple, etc. the effective length of the lever. In a further alternative embodiment, a standard length lever may be detached and replaced with an elongate replacement lever which is longer than said standard length lever.

In embodiments where additional lever portions may be added to a primary lever, each lever may include a portion which is adapted to receive a portion of a further lever. Thus, each lever may include an extension means adapted or configured to engage with a second extension means provided on a lever extension component.

DETAILED DESCRIPTION

Figure 1B:
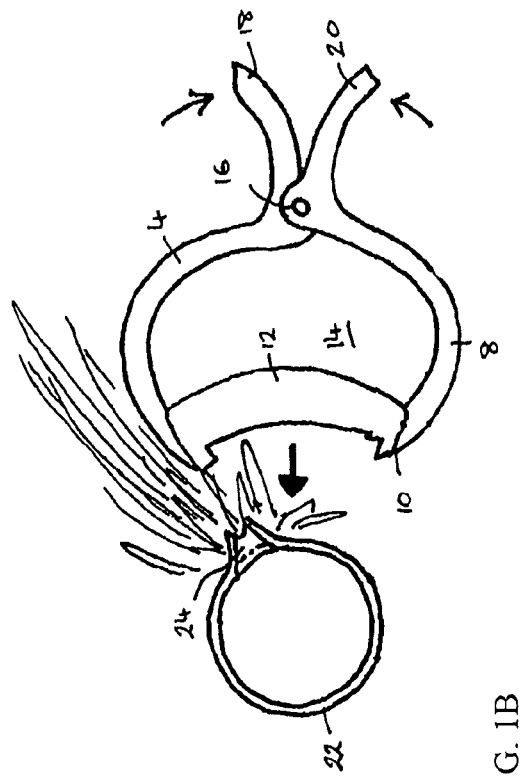
FIGS. 1A to 1D Shows side elevational views of the application of a pipe attachment according to a first embodiment of the invention to a pipe including a leak.

FIGS. 1A to 1D show the application of a pipe attachment 2 to a pipe 22 having a hole 24 therein.

The pipe attachment 2 comprises a frame formed from first jaw element 4, having a distal end 6 and a second jaw element 8 having a distal end 10. The first and second jaw elements 4, 8 have an open configuration in which the distal ends 6, 10 are spaced apart (see FIGS. 1B and 1C), and a closed configuration in which the distal ends 6, 10 are adjacent to each and maintained in an abutting relationship (see FIG. 1D).

When in the closed configuration, the two jaw elements 4, 8 of the frame define a substantially cylindrical cavity.

Secured to the distal end portions 6, 10 of the jaw elements 4, 8 is a stretchable, flexible waterproof membrane 12 formed from a suitable elastomer. As can be seen from FIG. 1A and FIG. 1B, the membrane 12 is only secured to the distal ends of the jaw elements 4, 8 via opposed end portions of the membrane 12 and the body portion of the membrane 12 between the two end portions is free from the frame of the attachment 2. As can be seen from FIGS. 1A and 2B, a void 14 is defined between the body portion of the membrane 12 between its secured end portions and the frame of the attachment 2.

The two jaw elements 4, 8 are hinged together at their proximal ends by a fulcrum 16 defined by a metal pin which passes through both jaw elements 4, 8. Wrapped around the fulcrum 16 (but not shown in the Figures) is a coiled metal spring, arranged to bias the jaws elements to the closed configuration.

Extending rearwardly from the fulcrum and forming a rear part of each jaw element 4, 8 is a respective lever 18, 20. The levers 18, 20 are curved so that they angle away from each other.

Figure 1D:
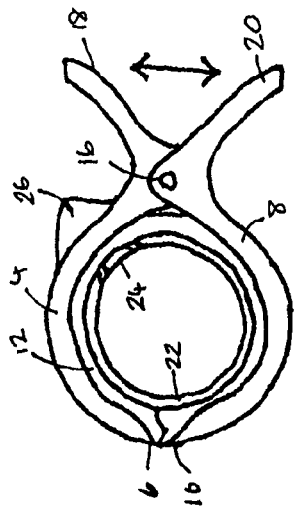
Figure 1A:
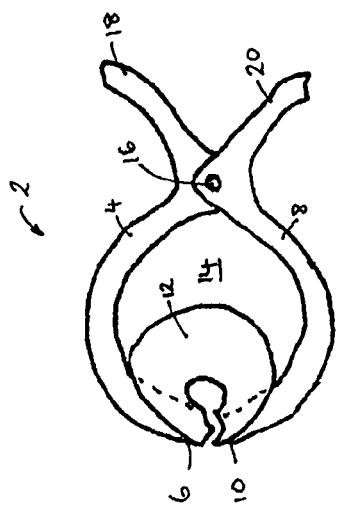
Figure 1C:
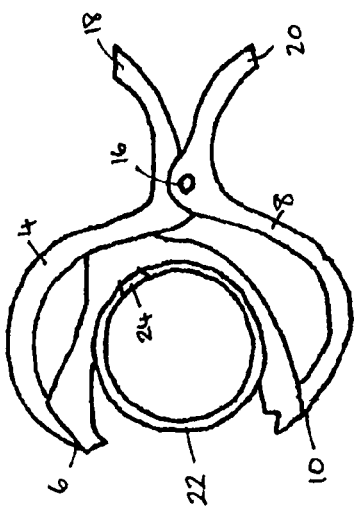

As shown in FIG. 1A, the membrane 12 has a rest or unstretched configuration in which it is curved between its secured end portions. FIG. 1B shows the membrane 12 in a first stretched configurations in which it is pulled taught between the open jaws and defines a barrier to the interior of the cavity defined by the jaw elements 4, 8. FIG. 1C shows membrane 12 in a second, further stretched configuration in which the attachment 2 has been urged over a pipe 22 which includes a hole 24 through which pressurised water is leaking. In this figure, the membrane 12 is being stretched around the pipe 22 and covers the hole 24. Finally, FIG. 1D shows the membrane 12 in a fully stretched configuration in which it fully surrounds the pipe 22. In this configuration, the stretched membrane 12 forms a water-tight seal around the hole 24, despite the fact that the water pressure forms a bulge 26 in the membrane.

In FIG. 1D, the force of the spring (not shown) is sufficient to keep the jaws 4, 8 of the frame in the closed configuration.

Figure 2:
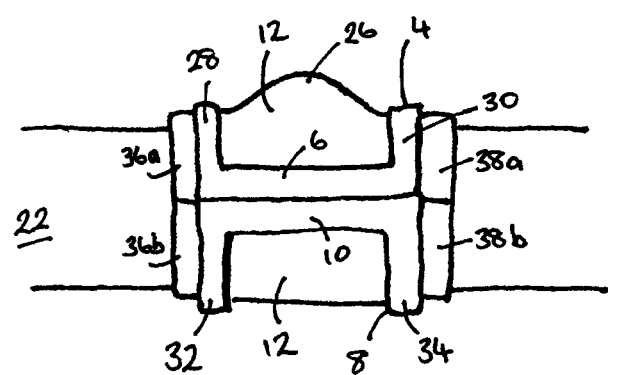
FIG. 2 shows a front elevational view of the pipe attachment of FIG. 1 secured to a pipe including a leak.

FIG. 2 shows a front elevational view of the attachment 2. As can be seen in this figure, the jaw element 4 is formed from two curved side elements 28, 30 which are joined at their distal ends by the distal end element 6. Similarly, the jaw element 8 is formed from two curved side elements 32, 34 which are joined by the distal end element 10. The two curved side elements and the distal end element of each jaw define one half of the frame. As can be seen from FIG. 2, each jaw defines therein an aperture through which the bulge 26 in the membrane 12 can protrude.

It will also be noted from FIG. 2 that the membrane 12 extends beyond the sides of the jaw elements 4, 8 to provide a first sideways extending portion 36a, 36b and a second sideways extending portion 38a, 38b. These first and second sideways extending portions allow the attachment 2 to be used to prevent or minimise a leak from a pipe joint or fixing by abutting the attachment 2 against the pipe joint or fixing such that the sideways extending portion engages an end face of the pipe joint or fixing to form a seal. The attachment 2 is then secured to the pipe 22 in this position to maintain the seal.

In use, a pipe attachment 2 is secured to a pipe 22 as shown in the sequence of FIGS. 1A to 1D. A user squeezes towards each other the two levers 18, 20, which overcomes the biasing force of the spring to open the jaws 4, 8 and stretches the membrane 12 to its first stretched configuration (FIG. 1B). With the jaws open and the membrane 12 in its first stretched configuration, the attachment is urged forwards such that the pipe 22 enters the cavity defined by the jaws 4, 8 (FIG. 1C). The urging of the attachment 2 stretches the membrane 12 to its second stretched configuration. Once the pipe is located within the cavity and the membrane 12 covers the hole 24, the levers 18, 20 are released and the biasing force of the spring urges the jaws 4, 8 to close around the pipe 22 (FIG. 1D).

Figure 3A:
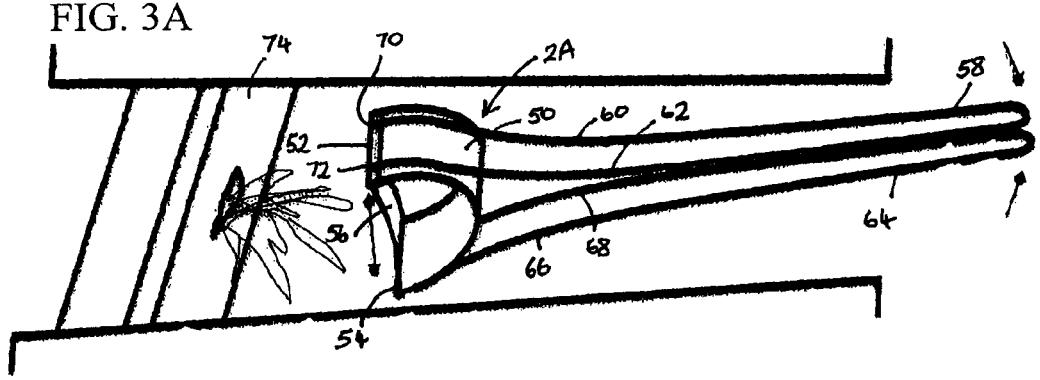
FIGS. 3A to 3C show perspective views of the application of a pipe attachment according to a second embodiment of the invention to a pipe including a leak.
Figure 3B:
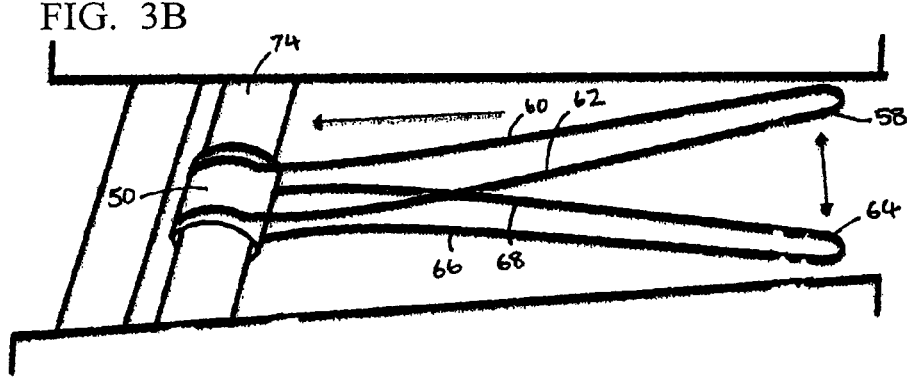
Figure 3C:
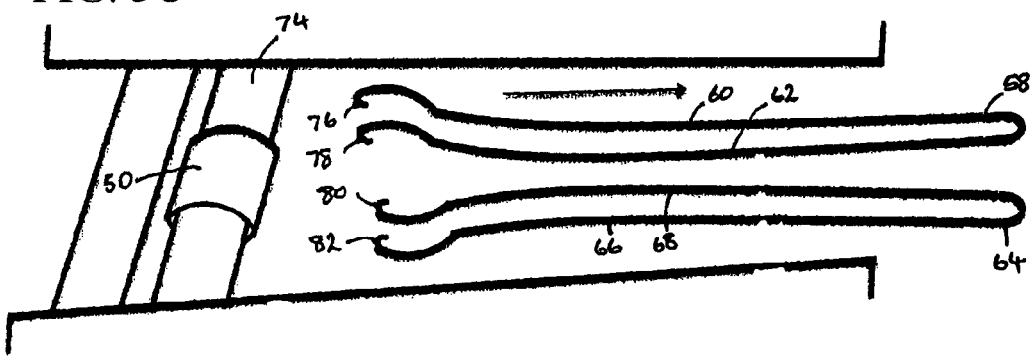

A second embodiment of the invention is shown in FIGS. 3A to 3C.

In this embodiment, rather than the frame being formed from a pair of jaw elements which are hinged together with a spring element to bias them to the closed configuration, a pipe attachment 2A includes a frame 50 which is formed from spring steel and which is arranged to bias a pair of opposed jaws 52, 54. As with the previous embodiment, a membrane 56 formed from an elastomer extends between the opposed jaws 52, 54 and is secured to the frame only via opposed end portions of the membrane 56 being secured to the distal ends of the opposed jaws 52, 54.

A first elongate lever 58 comprising a pair of legs 60, 62 is secured to one of the jaws 52 and a second elongate lever 64 comprising a pair of legs 66, 68 is secured to the other jaw 54. The first elongate lever 58 is secured to the respective jaw 52 via leg receiving catches 70, 72 formed in the distal end of the jaw 52. Only the catches of the first jaw 52 are shown in FIG. 3A, but the second jaw 54 includes a corresponding arrangement to engage the legs 66, 68 of the second elongate lever 64.

The use of elongate levers in this embodiment allows the attachment 2A to be used with pipes where access is restricted.

As shown in FIG. 3A, when the levers 58, 64 are squeezed towards each other, the jaws 52, 54 are opened and the membrane 56 is stretched to its first stretched configuration. The attachment 2A is then secured to a pipe 74 in a manner very similar to the first embodiment. However, in this embodiment, once the pipe 74 is securely located within the frame 50, the levers 58, 64 may be detached from the frame 50.

FIG. 3C shows the levers 58, 64 detached from the frame 50. It can be seen that each leg 60, 62, 66, 68 includes a respective hook portion 76, 78, 80, 82 wherein each hook portion is sized and shaped to engage with a corresponding leg receiving catch to provide the attachment 2A with detachable levers 58, 64. The frame 50 can be left in place with the levers 58, 64 removed or it can subsequently removed by re-attaching the levers 58, 64 to the respective jaws 52, 54, opening the jaws 52, 54 by squeezing the levers 58, 64 towards each other and disengaging the frame 50 from the pipe 74.

The skilled person will appreciate that the elongate levers 58, 64 need not be detachable from the frame 50. Thus, in a further embodiment, the levers 58, 64 are fixed to the frame 50 and are not detachable. In this embodiment, the attachment 2A would remain in the configuration shown in FIG. 3B.

Additionally, the elongate levers 58, 64 may be replaced in this embodiment with shorter levers, such as similar to those shown in FIGS. 1A to 1D. The shorter levers may be fixed to the frame 50 (i.e. are not detachable) or they may be releasably coupled to the frame 50.

The invention claimed is:

1. A pipe attachment for sealing a leak, the attachment comprising a frame formed by a pair of opposed frame elements and a stretchable waterproof membrane permanently fixed to the frame elements such that said frame is capable of defining a substantially cylindrical cavity; wherein each frame element defines an end of the frame and said stretchable membrane defines an intermediate portion located between said opposed ends, said frame having a closed configuration in which said frame elements of the frame are adjacent to each other, and an open configuration in which said frame elements of the frame are spaced apart from each other; said frame including a securing means for resisting the opening of said frame elements in their closed configuration; and wherein said stretchable waterproof membrane is formed from an elastomer and includes opposed end portions, each of said membrane end portions being permanently fixed to a respective one of the frame elements, and said stretchable waterproof membrane being secured to the frame elements only via said end portions; said stretchable waterproof membrane having an unstretched configuration and a stretched configuration when a pipe is located within said defined cylindrical cavity and said membrane is stretched around said pipe.

2. A pipe attachment according to claim 1, wherein the stretchable waterproof membrane lies adjacent to a circumferential surface of the pipe when in said stretched configuration.

3. A pipe attachment according to claim 1, wherein intermediate portion of each frame element comprises two or more curved transverse supports located between said opposed frame elements.

4. A pipe attachment according to claim 1, wherein said frame comprises a pair of opposed jaw members and each jaw member comprises a respective proximal end opposite to a distal end and an intermediate portion located between said distal and proximal ends, and the two opposed jaw members are hingedly coupled to each other at their proximal ends.

5. A pipe attachment according to claim 4, wherein the intermediate portion of each jaw member comprises two or more curved transverse supports located between said proximal and distal ends.

6. A pipe attachment according to claim 5, wherein the securing means includes a biasing element arranged to bias said jaw members to the closed position, and each jaw member includes a lever projecting away from its distal end, wherein said levers are arranged to open the jaw members when said levers are urged towards each other.

7. A pipe attachment according to claim 6, wherein the levers are attached to said jaw members.

8. A pipe attachment according to claim 7, wherein the two opposed jaw members are hingedly coupled to each other at their proximal ends and said levers are attached to the proximal ends of the jaw members.

9. A pipe attachment according to claim 1, wherein the stretchable waterproof membrane is adhered to the frame elements.

10. A pipe attachment according to claim 1, the frame elements are formed from a polymeric material and said stretchable waterproof membrane is welded to said frame elements.

11. A pipe attachment according to claim 1, wherein the frame includes a pair of opposed sides and the membrane extends beyond at least one side of the frame.

12. A method of stopping a leak in a pipe, said method comprising:
(i) providing a pipe attachment comprising a frame including a pair of opposed frame elements and a stretchable waterproof membrane permanently fixed to said frame elements such that said frame is capable of defining a substantially cylindrical cavity; wherein each frame element defines an end of said frame, and said stretchable membrane defines an intermediate portion located between said opposed ends, said frame having a closed configuration in which said opposed frame elements are adjacent to each other, and an open configuration in which said frame are spaced apart from each other; said frame including a securing means for resisting the opening of said frame elements when in said closed configuration; and wherein the stretchable waterproof membrane is formed from an elastomer, and includes opposed end portions, each of said membrane end portions being permanently fixed to a respective one of said frame elements, and said stretchable waterproof membrane being secured to the frame only via said end portions; said stretchable waterproof membrane having an unstretched configuration and a stretched configuration when a pipe is located within said defined cavity and said membrane is stretched around said pipe;
(ii) configuring said frame into an open configuration;
(iii) urging said attachment over a portion of a pipe that contains a leak such that the pipe is located within the cavity defined by the frame and said stretchable waterproof membrane is urged into a stretched configuration; and
(iv) securing said frame in its closed configuration whereby the stretchable waterproof membrane is stretched around the pipe to form a substantially watertight seal around the leak.

13. A method according to claim 12, wherein the securing means includes a biasing element arranged to bias said frame to its closed configuration.

14. A kit for sealing a leak, said kit including a pipe attachment and a pair of levers, the attachment comprising a frame including a pair of opposed frame elements and a stretchable waterproof membrane fixed to said frame elements such that said frame is capable of defining a substantially cylindrical cavity; wherein said stretchable waterproof membrane is formed from an elastomer; said frame has a closed configuration in which said frame elements are adjacent to each other, and an open configuration in which said frame elements are spaced apart from each other; said frame including a securing means for resisting the opening of the frame elements in said closed configuration; and wherein said pair of levers are attachable to said frame and are capable of urging said frame into its open configuration and said pair of levers are detachable from said pipe attachment when said frame is secured in its closed configuration.

15. A kit according to claim 14, wherein said frame is biased to its closed configuration.

* * * * *